United States Patent

[11] 3,577,883

| [72] | Inventor | Frank D. Werner |
| | | Bloomington, Minn. |
| [21] | Appl. No. | 836,867 |
| [22] | Filed | June 26, 1969 |
| | | Division of Ser. No. 669,036 |
| | | Sept. 20, 1967. Pat. No. 3,471,758 |
| [45] | Patented | May 11, 1971 |
| [73] | Assignee | Rosemount Engineering Company |
| | | Minneapolis, Minn. |

[54] CAPACITIVE STRAIN SENSOR
3 Claims, 4 Drawing Figs.

[52] U.S. Cl. ............................... 73/88.5,
317/246, 73/398
[51] Int. Cl. ............................... G01b 7/16,
G01n 3/00
[50] Field of Search ........................... 73/88.5,
141 (A), 398 (C); 317/246

[56] References Cited
UNITED STATES PATENTS

| 3,027,769 | 4/1962 | Coon | 73/398 |
| 3,122,919 | 3/1964 | Kendrick | 73/167 |
| 3,206,970 | 9/1965 | Dally et al. | 73/88.5 |
| 3,381,190 | 4/1968 | Hoogenboom | 317/246 |

Primary Examiner—Richard C. Queisser
Assistant Examiner—John Whalen
Attorney—Dugger, Peterson, Johnson & Westman ABSTRACT: A method of measuring strain wherein a metal rod is mounted transversely within a cylindrical test hole in a metal structure. A spaced relation is maintained between the rod ends and hole surface and changes in electrical capacitance between the rod and the structure are indicative of strains in the test structure.

Patented May 11, 1971

INVENTOR.
FRANK D. WERNER

BY Duggey, Peterson, Johnson & Westman

ATTORNEYS

Patented May 11, 1971

INVENTOR.
FRANK D. WERNER
BY
Dugger, Peterson, Johnson & Westman
ATTORNEYS

CAPACITIVE STRAIN SENSOR

CROSS-REFERENCE TO RELATED APPLICATION

This application is a divisional application of my application Ser. No. 669,036 filed Sept. 20, 1967, for Capacitive Strain Sensor, now U.S. Pat. No. 3,471,758.

BACKGROUND OF THE INVENTION

This invention relates generally to measurement of strain and more specifically relates to instrumentation for measurement of strain within a structure which instrumentation comprises an electrical capacitor having a capacitance dependent upon strain of the structure.

Strain measurements of a structure are most generally made with resistance strain gauges mounted directly to the structure being measured. The gauges may be of wire type or foil type and are most commonly cemented to the structure with an adhesive having very good electrical insulation characteristics and excellent mechanical bonding. The difficulties associated with obtaining a good bond along with high electrical insulation are numerous but good techniques have evolved and while satisfactory measurements can be made for many applications, there are also measurements which cannot be satisfactorily made by resistance gauge techniques. In addition to the installation problems of resistance gauges there exists a signal-handling problem since the resistance change associated with a typical strain range is quite small and typically is less than 1 percent. Then if it is necessary to measure strain to within 1 percent a system accuracy of one part in ten thousand is required in terms of the resistance of the gauge. Where the thermal environment is not severe strain measurement having an accuracy in the order of 1 percent are often accomplished with resistance gauges but the accuracy and reliability of such techniques falls rapidly as a severe environment, such as a high temperature, is encountered. The problems of maintaining a stable mechanical connection to the structure being measured and obtaining an accurate measurement of only that resistance change due to strain limit the usefulness of such techniques to moderately low temperatures.

A specific problem which has not been satisfactorily solved by prior art methods involves a strain measurement in the walls of large steam turbines used for generation of electrical power. These turbines typically have casing walls 8 to 10 inches thick and are subject to a temperature change from ambient to about 500° C. during startup. Thermally induced stresses and strains are high in such a structure and it is desirable to have a strain measurement as a control or warning parameter especially during startup and stop operations. Longterm "creep" effects a full load are also of interest and a gauge which has a high degree of stability is also desirable.

SUMMARY OF THE INVENTION

This invention comprises apparatus for measuring strain within a structure by sensing capacitance of the spacing between the internal surface of a cylindrical hole in the structure and the ends of a rod mounted within the hole transverse to the hole axis. The rod is spaced from the cylindrical surface by means which maintain an approximate position of the rod without significantly straining the rod. The ends of the rod and the inner surface of the structure form respective plates of an electrical capacitor. Accordingly, the rod is substantially mechanically isolated from strains in the structure and is a stable sensing element. Since the capacitance of the spacing varies inversely with spacing length a relatively large change of capacitance due to strain may be obtained by assembling the rod with an initial small spacing.

It is therefore a primary object of this invention to provide a strain sensor which is isolated in a substantially strain-free manner from the structure to be measured and which forms an electrical capacitor with the structure having a gap between plates which varies with strain in the structure.

DESCRIPTION OF THE PREFERRED EMBODIMENTS

Figure 1:
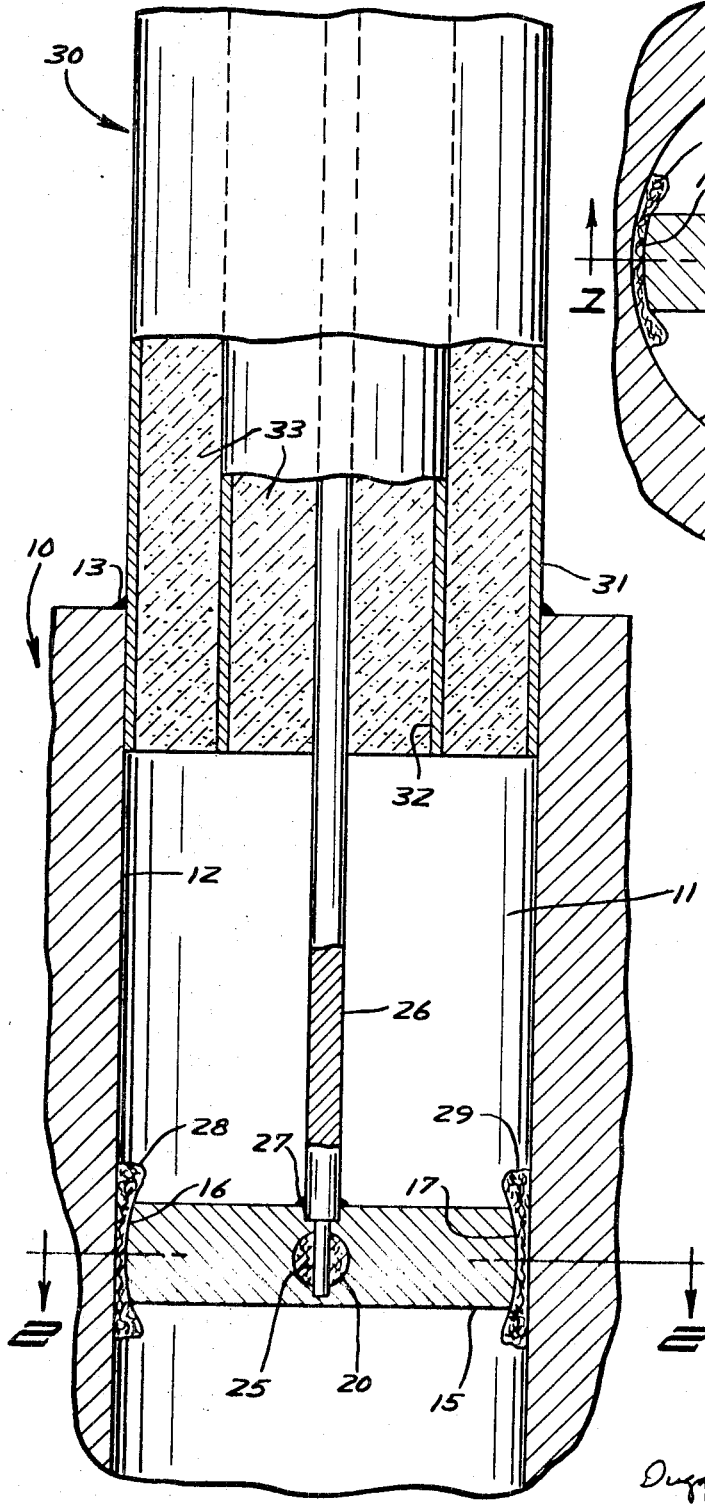
FIG. 1 is an elevation view in section of a first embodiment of the strain sensor mounted within a hole in a structure.
Figure 2:
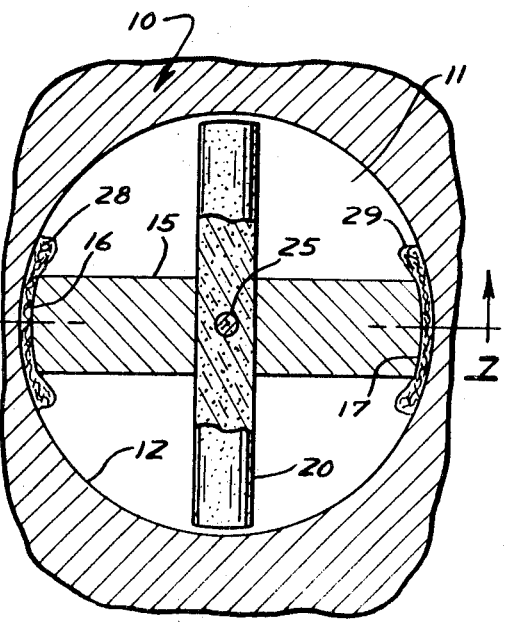
FIG. 2 is a plan view taken on line 2-2 in FIG. 1.

Referring to FIGS. 1 and 2 for a description of a first embodiment there is shown a portion of a metal structure 10 having a precise cylindrical hole 11 formed therein. The internal surface 12 bounding the cylindrical hole is carefully prepared by drilling and honing, for example, to give a smooth uniform diameter cavity. A metal rod 15 is positioned within the hole 11 so that its axis is perpendicular to the hole axis. As shown, the rod 15 has a large hole and a small hole which are perpendicular to each other and to the rod axis and are located in the center of the rod. The ends 16, 17 of the rod 15 are hemispherical having a radius equal to or slightly smaller than the radius of the hole 11. An insulator rod 20 having a length slightly smaller than the diameter of the hold 11 is mounted within the large hole in rod 15 and is held in position by projection 25 of conductor 26 which projection extends into the small hole in rod 15 and through a receiving hole in rod 20. Rod 20 also has ends which are hemispherical having a radius equal to or somewhat smaller than radius of hole 11. Projection 25 preferably has a slight taper providing an interference fit with rod 20 and conductor 26 is welded to rod 15 at 27 so that the assembly including rod 15, and 20, and conductor 26 maintains substantially fixed relative positioning of rods 15 and 20. The clearance between insulator rod 20 and surface 12 is just large enough to accommodate changes in dimensions due to temperature and strain without giving mechanical interference at both ends. For a ¾-inch diameter hold 11 this clearance may be about 1 mil for example. The clearance between the rod ends 16, 17 of rod 15 and surface 12 is larger and may be about 5 to 10 mils and is occupied by insulators 28, 29. Insulators 28 and 29 are shown as pads of material which are compressed between rod ends 16, 17 and surface 12. Insulators 28, 29 preferably have some resiliency and, thus, made constant contact both to surface 12 and the rod ends and tend to center rod 15 within hole 11. The insulators may be conveniently formed from loosely woven glass or quartz fiber for example, or may be pieces of expanded mica. Conductor 26 forms the inner conductor of a double-shielded conducting cable 30 which has an outer metallic sheath 31 welded to structure 11 at 13. The inner conducting sheath 32 is situated approximately midway between inner conductor 26 and outer sheath 31 and the space between 26 and 32 and between 32 and 31 is filled with insulation 33 comprising a quartz fabric or ceramic powder. Such cables are commonly known in the art and are often compacted by swaging of the entire cable through a draw die after assembly of conductors and insulation. In some instances, the ends of the cables are further treated by firing of the insulation to form a glaze over the ends thereby preventing loss of material from the ends. Such treatments may give a gas porous or nonporous termination depending upon materials and treatment used.

Structure 10 may be a portion of a steam turbine casing wall which is subjected to high temperature changes during transient operations. In this case, hole 11 could be a ¾-inch diameter hole formed at least part way through a portion of a 10-inch thick cast iron casing. Hole 11 is first drilled and then carefully honed to a smooth uniform bore. Rod 15, together with insulators 28, 29 and rod 20, all mounted on the end of cable 31, is then pushed into hole 11 with care being taken to align the axis of rod 15 with the desired direction of measurement. After rod 15 has been inserted to a desired depth, cable 31 is welded or otherwise fastened to structure 10. Central conductor 26 connects to rod 15 and ends 16, 17 of rod 15 to form one electrode of a capacitor. The other capacitor electrode is hole surface 12 which connects electrically to outer shield 31. Typically, outer shield 31 is electrical and inner shield 32 is driven at substantially the same potential as central conductor 26 and rod 15 to minimize stray capacitances. Thus, the three conductors 26, 31, and 32 form a three-terminal network and accurate measurements may be made of the clearance, or gap, between ends 16, 17 and surface 12 through a capacitance measurement. An example of a commercially available bridge instrument for making three-terminal capacitance measurements is the Universal Bridge B221 made by the Wayne Kerr Laboratories, Ltd., Chessington, Surrey, England.

Rod 15 is preferably of the same material as structure 10 so that the gap changes due to a uniform temperature change will be small. If the temperature coefficient of expansion of rod 15 is identical to structure 10, the gap change with temperature would equal this temperature coefficient. If the material of rod 15 has a slightly larger coefficient of expansion than structure 10 the change of capacitance with temperature will be nearly zero. However in most cases, a uniformity of materials results in a satisfactory design. Rod 20 which aids centering of rod 15 is preferably a ceramic rod of aluminum oxide or sapphire for long life in a high-temperature environment. It is desirable that rod 20 have about the same expansion coefficient as structure 10 and rod 15 but in any event rod 20 must be short enough so that interference between both its ends and surface 12 is prevented at all normal combinations of temperature and strain to be encountered.

As structure 10 is strained, as a result of external forces or thermal gradients for example, hole 11 will undergo diameter changes. These diameter changes will not be mechanically transferred to rod 15 since any such changes could only be transmitted through insulators 28, 29 which have a stiffness which is substantially negligible compared to the stiffness of structure 10 and rod 15. Accordingly, rod 15 is isolated from strains in structure 11 and a change in gap between rod ends 16, 17 and surface 12 as measured by the capacitance between conductors 26 and 31 accurately reflects the strain along one axis or direction additional rods similar to rod 15 may be mounted within holes in structure 10. It may be noted that the actual stress condition existing at surface 12 due to a uniaxial uniform tensile force perpendicular to hole 11 is rather complicated. The uniform tensile force will give a uniform tensile stress at a position remote from hole 11. The stress on surface 12 then varies from a tensile stress having a magnitude three times that of the uniform tensile stress at diametral positions perpendicular to the uniform stress direction to a compressive stress equal in magnitude to the uniform tensile stress at diametral positions parallel to the uniform tensile stress direction. This stress condition is of a highly localized nature however and displacements, or motion, of the hole surface 12 generally follows the displacements that occur throughout the strained structure. More precise relations between hole surface deformation and remote strain or stress conditions may be determined by analytic and/or experimental techniques.

In some applications it is desirable to continually flush hole 11 and the components therein with a dry gas and this may be accomplished by leaving the ends of insulation 33 in porous state and remotely connecting tubular electrode 32 to a gas supply (not shown) and letting the gas enter hole 11 by way of the porous insulation between conductors 26 and 32 and leave by way of the porous insulation between conductors 31 and 32. The cavity between conductors 31 and 32 may be vented at any convenient remote location to exhaust the gas.

Figures 3, 4:
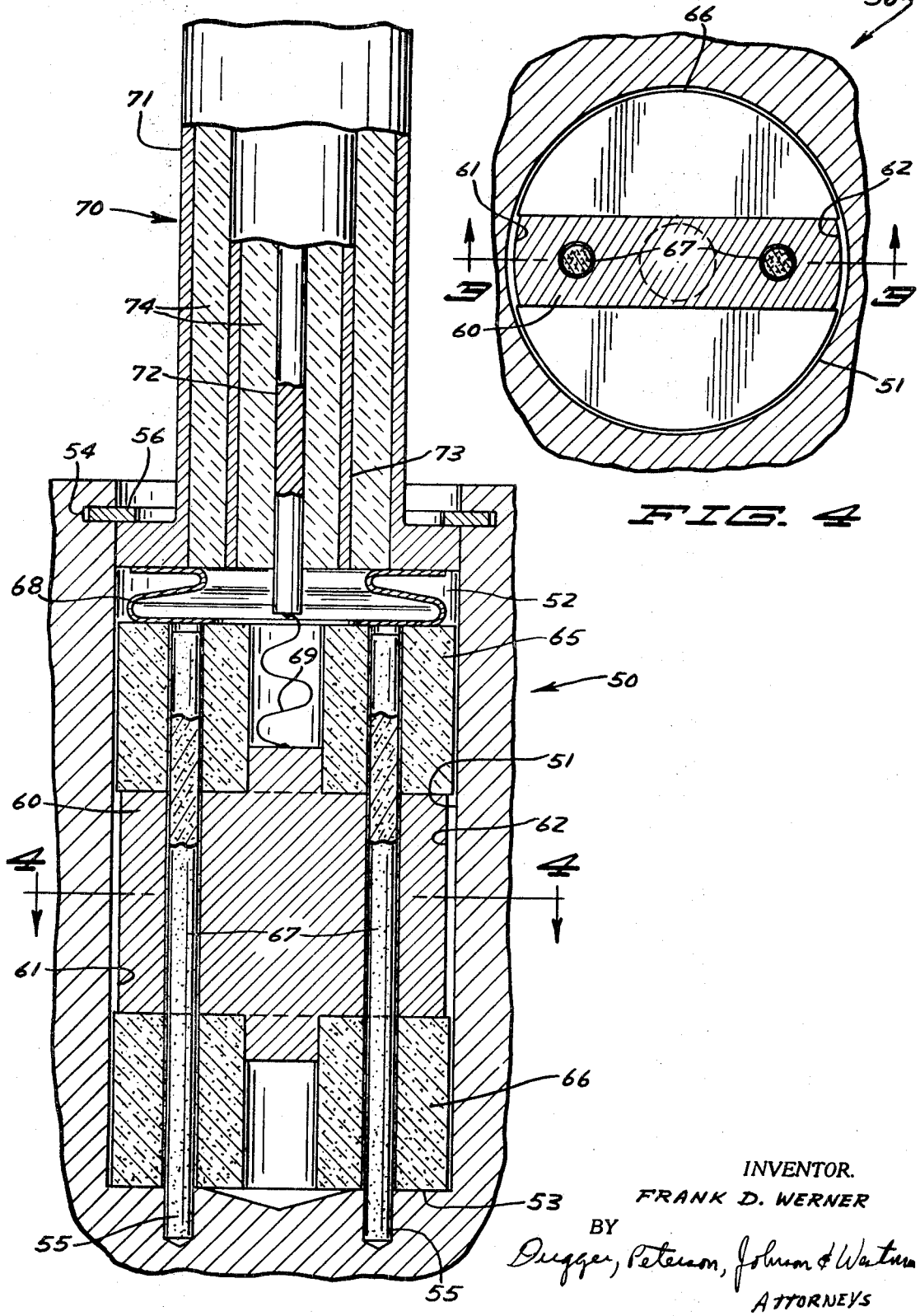
FIG. 3 is an elevation view in section of a second embodiment of the strain sensor.
FIG. 4 is a plan view taken on line 4-4 in FIG. 3.

A second embodiment is shown in FIGS. 3 and 4 where hole surface 51 of structure 50 corresponds to hole surface 12 in structure 10 of FIG. 1. The hole 52 is formed generally as described in connection with FIG. 1 except that a smooth bottom surface, or shoulder, 53 is machined perpendicular to the hole axis. Also one or more holes 55 are drilled as shown to accommodate alignment rods described below and a groove 54 is machined near the top of the hole 51 to receive a retainer ring 56. Hole surface 51 forms one electrode of a capacitor and surfaces 61, 62 of member 60 forms the other electrode. The gap between 61, 62 and surface 51 is prevented from going to zero by means of alignment rings 65 and 66 located at the top and bottom ends respectively of electrode member 60. Rings 65 and 66 are of insulator material, preferably a ceramic, and are made to have an inner diameter which substantially an interference fit with mating projecting portions of electrode 60. The outer diameter of rings 65 and 66 is slightly larger than the diameter between electrode surfaces 61, 62 but is just small enough so that the maximum deformations of hole 52 may be tolerated without causing interference between rings 65, 66 and hole surface 51. Thus rings 65, 66 locate electrode 60 approximately centrally in hole 52 and prevent electrode surfaces 61, 62 from coming into contact with surface 51. Insulator rods 67 are dropped loosely through their receiving holes which pass through ring 65, through electrode 60, through ring 66 and into structure 50 via holes 55. These rods are loose fitting to avoid interference and yet prevent electrode 60 from rotating about the axis of hole 52 by acting as "stops."

An annular spring member 68 abuts against the top side of ring 65 and holds rods 67 within their holes as well as holding the electrode assembly comprising rings 65, 66 and electrode 60 against shoulder 53. Spring 68 preferably is of a stiffness sufficiently low so that electrode 60 is not significantly strained by its holding action and yet is maintained in position. The top side of annular spring 68 is held down by outer conductor sheath 71 of cable 70. Cable 70 is retained in position by means of retainer ring 56. Inner conductor 72 is electrically connected to electrode 60 by means of flexible connection 69 and inner conductor sheath 73 is spaced from conductors 71 and 72 by insulation 74.

The embodiment of FIG. 3 can be gas flushed in the same manner as described above and since a retainer ring is used to hold the cable 70 to structure 50 the incoming gas may be supplied through one or both of the annular insulation filled passages between conductors 71, 73, and 72, 73. The gas will then exhaust around retainer ring 56 which does not give a gas tight seal.

The two embodiments shown herein are similar in that an electrode is provided which is substantially isolated mechanically from the structure undergoing strain, thereby providing a "strain-free" mounting of the electrode. The means of isolation is different for the two embodiments. The first embodiment is especially suited for applications where the hole may be deep and of small diameter while the second embodiment may be more satisfactory where the hole is more shallow and where temperature becomes very high.

In either embodiment the capacitance measured is not strongly dependent upon possible small changes in position of the "isolated" electrode. If the electrode is perfectly centered within a cylindrical hole in the first embodiment a small motion of the electrode in any one of the 6° of freedom will not significantly change the capacitance being measured. In the second embodiment only motions which are transverse to the hole axis are possible and it is equally true for those 2° of freedom that small motions about a central position will not change the capacitance. A similar small motion of the hole surface will result in a measurable change in capacitance however. The capacitance change due to strain can be quite large. For example, if the hole diameter is three-fourths inch and the strain is $2 \times 10^{13}$ the hole diameter will change in the order of 1 mil. Then if the gap is 4 mils at zero strain the signal at a strain of $2 \times 10^{13}$ would correspond to a 12.5 percent capacitance change. This signal is on the order of 10 times that available from a resistance gauge and since no bonding agents or critical mechanical connections to the structure are required, the embodiments herein disclosed are capable of providing superior measurements under severe measuring conditions.

I claim:

1. A method of measuring strain along a first predetermined axis in a test structure comprising the steps of making a hole defined by a metallic surface in the structure, said hole extending along a second axis transverse to the first axis, mounting capacitive sensing rod means to position its axis transverse to said second axis within the hole in position with the rod ends closely spaced from the metallic surface, and measuring the capacitive change between the ends of said rod means and the metallic surface when said structure is subjected to strain.

2. A method of determining strains in an operating structure having a wall that is subjected to strains in use comprising the steps of making a hole directly in the wall of said structure, said hole being defined by a metallic side surface defined about an axis, placing a rodlike electrical capacitance sensing element in said hole transverse to said axis and having end portions closely spaced from the side surface at spaced locations along said side surface, and measuring capacitive changes between the side surface defining said hole and the end portions of said element when said structure is in use.

3. The method of determining the strain in a structure in which the strain is to be measured comprising the steps of forming a hole within the structure opening to an outer surface of said structure, said hole being defined by a metal side surface generated about an axis and having a bottom wall opposite from the opening of said hole, positioning a rodlike conductive element within the confines of said hole with end-sensing surfaces of said element closely spaced from the side surface of said hole at spaced locations along said side surface, and substantially spaced from the bottom wall of said hole, and measuring the capacitive changes between the end surfaces of said element and the side surface of said opening when said structure is subjected to strain in direction transverse to the axis of said hole.

PO-1050
(5/69)

UNITED STATES PATENT OFFICE
CERTIFICATE OF CORRECTION

Patent No. 3,577,883  Dated May 11, 1971

Inventor(s) Frank D. Werner

It is certified that error appears in the above-identified patent and that said Letters Patent are hereby corrected as shown below:

Column 1, lines 33 & 34 "measurement" should be--measurements--; Column 1, line 53 "Longterm" should be--Long term--; Column 1, line 53 "a" should be--at--. Column 2, line 32 "and 20" should be--rod 20--; Column 2, line 37 "hold" should be--hole--. Column 3, line 1 after "electrical" insert--ground--. Column 4, line 6 after "which" insert--gives--.

Signed and sealed this 21st day of September 1971.

(SEAL)
Attest:

EDWARD M. FLETCHER, JR.  ROBERT GOTTSCHALK
Attesting Officer  Acting Commissioner of Patents